(12) United States Patent
Caywood et al.

(10) Patent No.: US 11,142,344 B2
(45) Date of Patent: Oct. 12, 2021

(54) FOREIGN OBJECT DAMAGE ELIMINATION SYSTEM

(71) Applicant: Sikorsky Aircraft Corporation, Stratford, CT (US)

(72) Inventors: David W. Caywood, Avon, CT (US); Pellumb Ameti, Oxford, CT (US); Michael Tabone, Wilton, NH (US); Kneil Northrop, Hamden, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 176 days.

(21) Appl. No.: 16/454,589

(22) Filed: Jun. 27, 2019

(65) Prior Publication Data

US 2019/0315493 A1 Oct. 17, 2019

Related U.S. Application Data

(62) Division of application No. 15/327,565, filed as application No. PCT/US2015/041092 on Jul. 20, 2015, now Pat. No. 10,384,807.
(Continued)

(51) Int. Cl.
*B64F 5/40* (2017.01)
*B64C 27/473* (2006.01)
(Continued)

(52) U.S. Cl.
CPC ............... *B64F 5/40* (2017.01); *B24C 3/00* (2013.01); *B64C 27/467* (2013.01);
(Continued)

(58) Field of Classification Search
CPC ..... B64F 5/40; B64F 5/30; B24C 3/00; B64C 27/467; B64C 27/273; B64C 2027/4733
See application file for complete search history.

(56) References Cited

U.S. PATENT DOCUMENTS 3,798,102 A 3/1974 Penyak
5,283,020 A 2/1994 Gasper et al.
(Continued)

FOREIGN PATENT DOCUMENTS

EP 0225573 A2 6/1987

OTHER PUBLICATIONS

Notification of Transmittal of the International Search Report for International Application No. PCT/US15/41092 dated Sep. 10, 2015; dated Oct. 13, 2015; 10 pages.
(Continued)

*Primary Examiner* — David P Bryant
*Assistant Examiner* — Nirvana Deonauth
(74) *Attorney, Agent, or Firm* — Foley & Lardner LLP

(57) ABSTRACT

An assembly configured to prevent damage to an object during manufacture thereof is provided including a first housing having a substantially hollow interior. An exposed first planar surface of the first housing includes an inlet port and a plurality of small openings formed about the periphery. The inlet port, the hollow interior, and the plurality of small openings form a fluid flow path through the assembly. A second housing similar in size and shape to the first housing, has an exposed second planar surface. An intermediate layer is arranged between the first housing and the second housing. A cross-section of the intermediate layer is configured to change shape in response to a compression force applied thereto by the first housing and the second housing to form a seal separating an exterior portion of the objection exposed to the plurality of small openings from an interior surface of the object.

10 Claims, 7 Drawing Sheets

Related U.S. Application Data

(60) Provisional application No. 62/027,594, filed on Jul. 22, 2014.

(51) Int. Cl.
  *B24C 3/00* (2006.01)
  *B64C 27/467* (2006.01)
  *B64F 5/30* (2017.01)

(52) U.S. Cl.
  CPC .... *B64C 27/473* (2013.01); *B64C 2027/4733* (2013.01); *B64F 5/30* (2017.01)

(56) References Cited

U.S. PATENT DOCUMENTS

| | | |
|---|---|---|
| 5,311,639 A | 5/1994 | Boshier |
| 2011/0052403 A1 | 3/2011 | Kawasetsu et al. |
| 2011/0180109 A1 | 7/2011 | Stillman et al. |
| 2013/0165024 A1 | 6/2013 | Araujo et al. |
| 2017/0158355 A1 | 6/2017 | Caywood et al. |

OTHER PUBLICATIONS

Written Opinion of the International Searching Authority for International Application No. PCT/US15/41092 dated Sep. 10, 2015; dated Oct. 13, 2015; 5 pages.

FOREIGN OBJECT DAMAGE ELIMINATION SYSTEM

CROSS REFERENCE TO RELATED APPLICATIONS

This application is a Divisional of U.S. patent application Ser. No. 15/327,565, filed Jan. 19, 2017, which is a U.S. National Stage application of PCT/US2015/041092, filed Jul. 20, 2015, which claims the benefit of U.S. Provisional Application No. 62/027,594, filed Jul. 22, 2014, the contents of which are incorporated by reference in their entirety herein.

BACKGROUND OF THE INVENTION

Exemplary embodiments of the invention relate to a rotary wing aircraft, and more particularly, to a method and apparatus for manufacturing a rotor blade of a rotary wing aircraft.

During fabrication of a rotor blade of a rotary wing aircraft, debris such as titanium and stainless steel splinters or chips can enter the blade spar and become trapped in the closed tip of the blade. In addition, these chips can become wedged between the conic and flat portions of the interior spar surface causing damage, such as scratches for example, to a critical area of the spar.

BRIEF DESCRIPTION OF THE INVENTION

According to one embodiment of the invention, an assembly configured to prevent damage to an object during manufacture thereof is provided including a first housing having a substantially hollow interior. An exposed first planar surface of the first housing includes an inlet port and a plurality of small openings formed about the periphery. The inlet port, the hollow interior, and the plurality of small openings form a fluid flow path through the assembly. A second housing, substantially similar in size and shape to the first housing, has an exposed second planar surface. An intermediate layer is arranged between the first housing and the second housing. A cross-section of the intermediate layer is configured to change shape in response to a compression force applied thereto by the first housing and the second housing to form a seal separating an exterior portion of the objection exposed to the plurality of small openings from an interior surface of the object.

In addition to one or more of the features described above, or as an alternative, in further embodiments the flow path is configured to counter a flow of debris into the interior surface of the object.

In addition to one or more of the features described above, or as an alternative, in further embodiments the inlet port is connected to a pump operably coupled to a fluid supply.

In addition to one or more of the features described above, or as an alternative, in further embodiments the fluid supply includes one of air or coolant.

In addition to one or more of the features described above, or as an alternative, in further embodiments the plurality of small openings is equidistantly spaced about the periphery of the first planar surface.

In addition to one or more of the features described above, or as an alternative, in further embodiments a portion of the plurality of small openings has a diameter larger than a remainder of the plurality of small openings.

In addition to one or more of the features described above, or as an alternative, in further embodiments the portion of small openings adjacent the inlet port have a smaller diameter than the remainder of the plurality of small openings.

In addition to one or more of the features described above, or as an alternative, in further embodiments at least one fastener extends through and is configured to affix the first housing, the intermediate layer, and the second housing.

In addition to one or more of the features described above, or as an alternative, in further embodiments a compression fastener extends through the first housing, the intermediate layer, and the second housing. A first nut coupled to the compression fastener is arranged adjacent the first planar surface, and a second nut connected to the compression fastener is arranged adjacent the second planar surface.

In addition to one or more of the features described above, or as an alternative, in further embodiments the compression force applied to the intermediate layer by the first and second housings is controlled by adjusting one of the first nut and second nut.

According to another embodiment of the invention, a method of cleaning a rotor blade spar is provided including inserting an assembly into a hollow interior of the spar. The assembly includes a first housing, a second, housing, and an intermediate housing disposed between the first and second housings. A seal is formed using the intermediate housing to separate a closed interior surface of the spar from an open interior surface of the spar. A flow of fluid is generated into a cavity of the first housing and out of holes in the first housing such that the fluid flows toward the open interior surface of the spar without passing into the closed interior surface of the spar.

In addition to one or more of the features described above, or as an alternative, in further embodiments the inserting the assembly into the spar includes positioning the spar between an inboard end of the spar and a critical surface of the spar.

In addition to one or more of the features described above, or as an alternative, in further embodiments forming the seal includes compressing the intermediate housing between the first housing and the second housing.

In addition to one or more of the features described above, or as an alternative, in further embodiments the intermediate housing is compressed by tightening a nut attached to a compression fastener extending through the first housing, the intermediate housing, and the second housing.

In addition to one or more of the features described above, or as an alternative, in further embodiments the flow of fluid into the cavity is generated by a pump operably coupled to a fluid supply, the fluid supply being one or air or coolant.

Technical effects include a rotor blade having minimal interior damage to flight critical surfaces.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
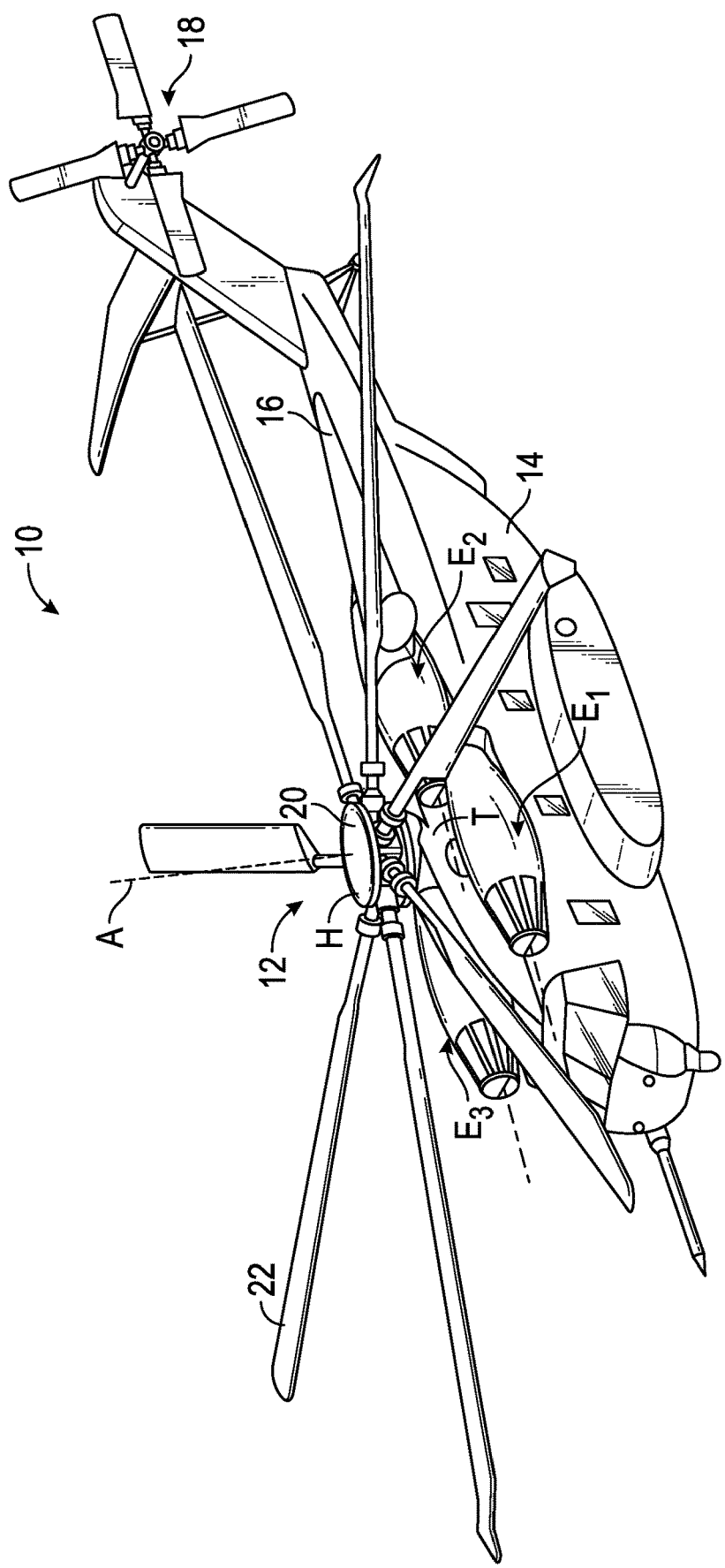
FIG. 1 is a perspective view of an example of a rotary wing aircraft.

FIG. 1 schematically illustrates a rotary wing aircraft 10 having a main rotor assembly 12. The aircraft 10 includes an airframe 14 having an extended tail 16 which mounts a tail rotor system 18, such as an anti-torque system, a translational thrust system, a pusher propeller, a rotor propulsion system, and the like. The main rotor assembly 12 includes a plurality of rotor blade assemblies 22 mounted to a rotor hub 20. The main rotor assembly 12 is driven about an axis of rotation A through a main gearbox (illustrated schematically at T) by one or more engines E. Although a particular helicopter configuration is illustrated and described in the disclosed embodiment, other configurations and/or machines, such as high speed compound rotary wing aircrafts with supplemental translational thrust systems, dual contra-rotating, coaxial rotor system aircrafts, tilt-rotors and tilt-wing aircrafts, and fixed wing aircrafts, will also benefit from embodiments of the invention.

Figure 2:
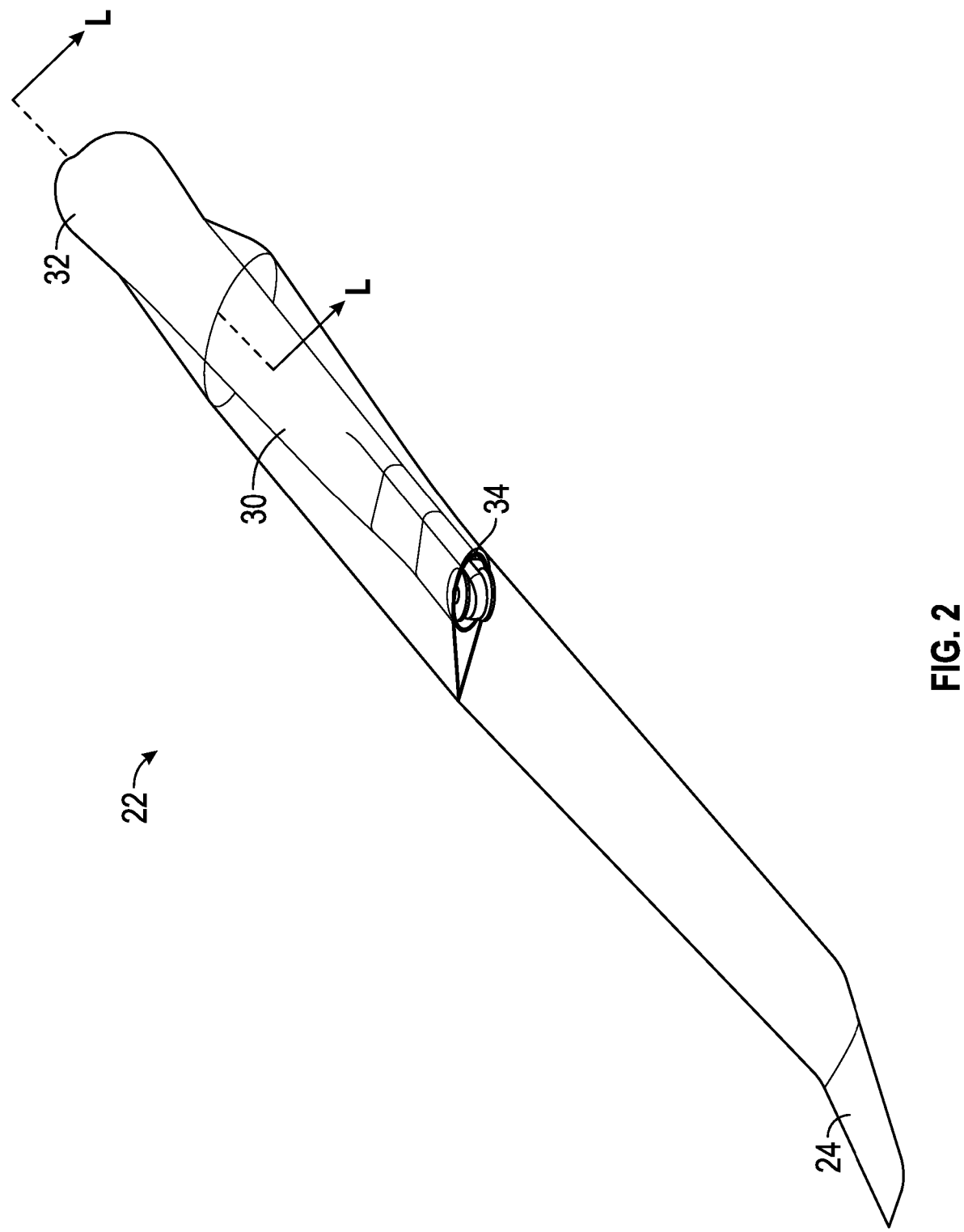
FIG. 2 is perspective view of a rotor blade assembly of a main rotor system of a rotary wing aircraft according to an embodiment of the invention.

Referring now to the exemplary rotor blade assembly 22 illustrated in FIG. 2, a generally hollow, tubular spar 30 configured to couple to the rotor hub 20 at an inboard end 32 extends over at least a portion of the length of the rotor blade assembly 22. In one embodiment, the spar 30 may extend to the blade tip 24 of the rotor blade assembly 22. The cross-section of the spar 30 may vary in size and shape over the length of the spar 30 depending on the contour of the rotor blade assembly 22. The spar 30 is a structural member having a high torsional and axial stiffness and strength and, therefore, may be made from a high strength material, including but not limited to metal, graphite, fiberglass or some combination thereof. While shown with tip 24 having swept geometry, it is understood that the tip 24 need not have a swept geometry in all embodiments of the invention.

During manufacturing of a rotor blade assembly 22 having a blade spar 30 with a closed outboard end 34, foreign objects can become deposited inside the spar 30. By way of example, during drilling or machining of one or more holes in the blade spar 30, metallic pieces of the spar 30 could be deposited inside the spar 30 and need to be removed. An assembly 40 configured to prevent foreign object damage is positioned within the blade spar 30 to remove such foreign objects according to aspects of the invention. The shown assembly 40 is removable with respect to the spar 30 and is removed from the spar 30 after manufacture is completed, although the invention is not limited thereto.

Figure 3:
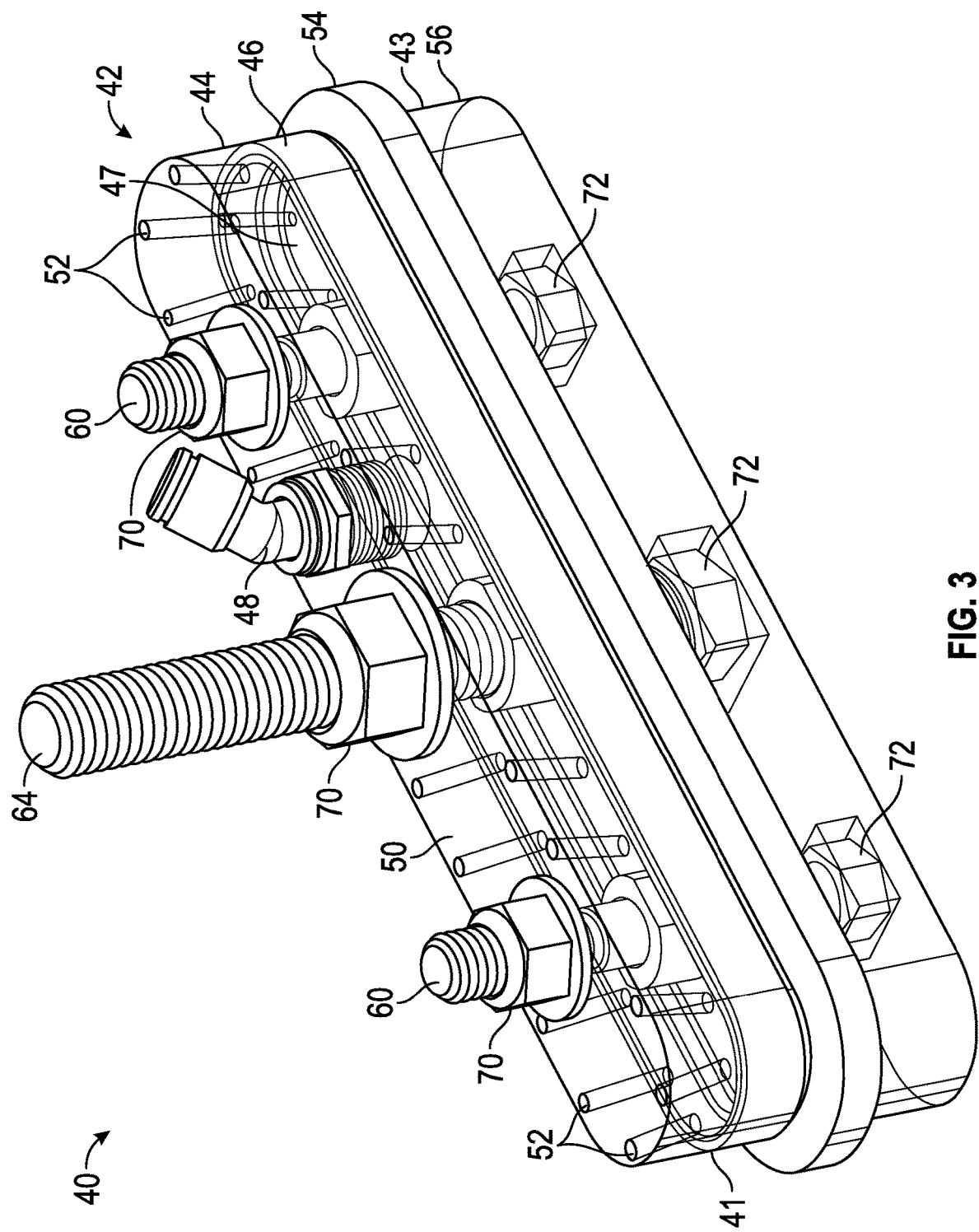
FIG. 3 is a perspective view of an assembly configured to prevent foreign object damage during the manufacture of a rotor blade assembly according to an embodiment of the invention.
Figure 4:
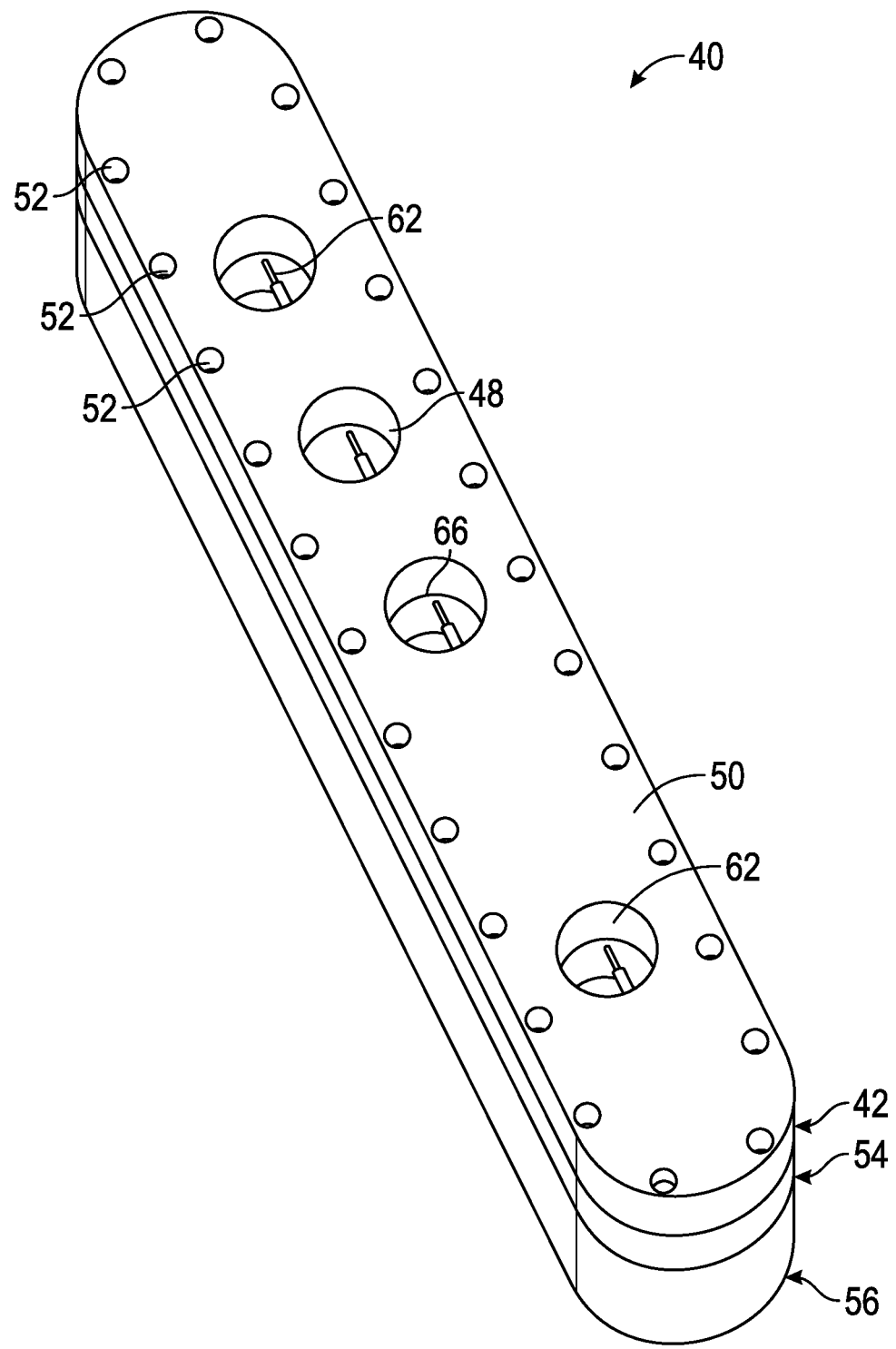
FIG. 4 is a perspective view of the assembly according to an embodiment of the invention.
Figure 5:
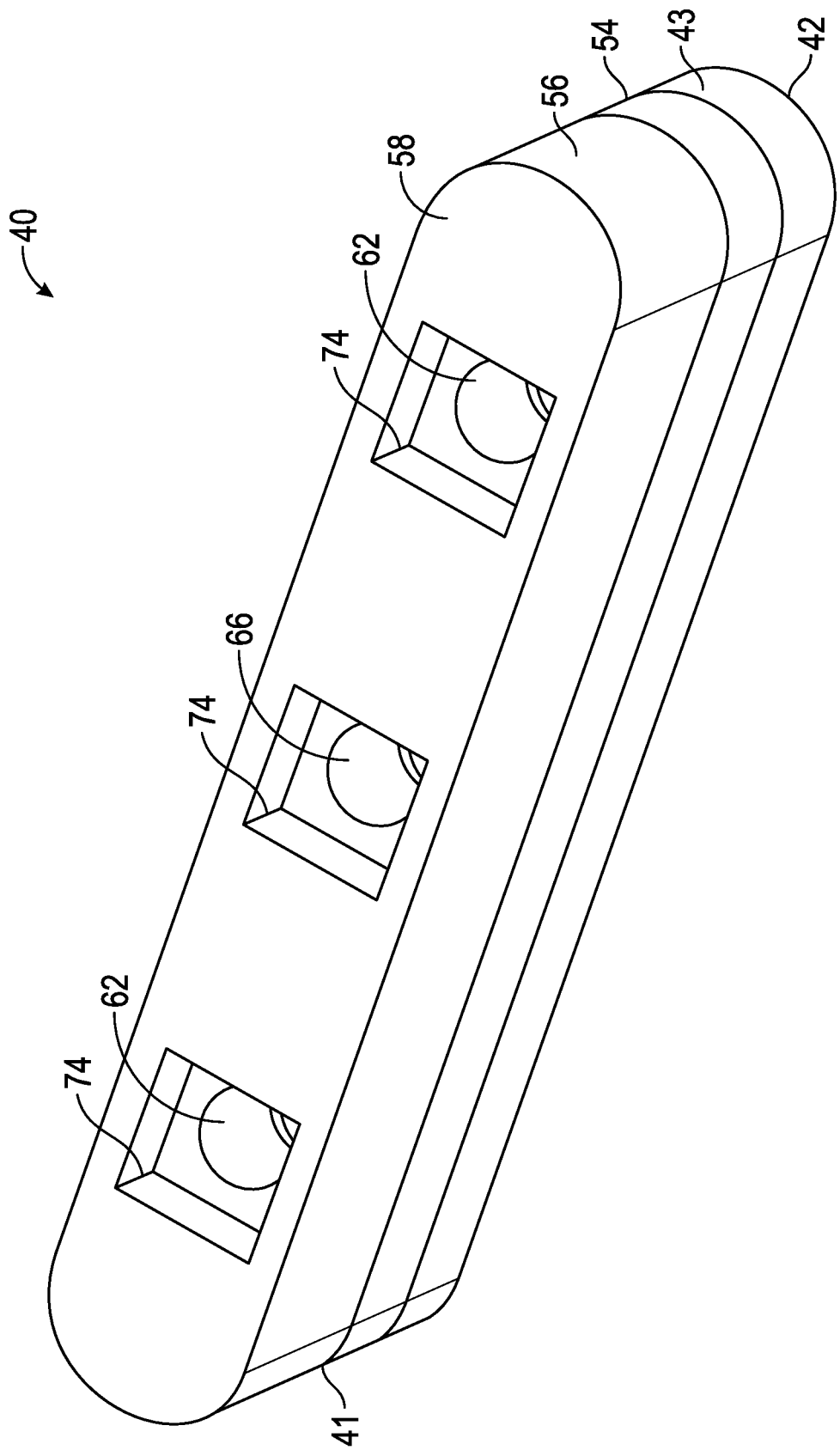
FIG. 5 is another perspective view of the assembly according to an embodiment of the invention.

Referring now to FIGS. 3-5 the assembly 40 is illustrated in more detail. The assembly 40 includes a first hollow housing 42 having a shape similar to the cross-sectional shape of the spar 30 at some position along its length. The first housing 42 may be formed from a plastic material, such as through an injection molding process for example; however other suitable materials, such as steel or aluminum for example, are within the scope of the invention. In the illustrated, non-limiting embodiment, the housing 42 is formed by a complementary first portion 44 and second portion 46 having a similar size and shape. The first and second portion 44, 46 may include features, such as a snap-fit connection for example, configured to selectively couple the first and second portion 44, 46 to one another to form the first housing 42. The first portion 44 is solid, and the second portion 46 has a cavity 47.

An inlet port 48 is formed in a first planar surface 50 of the first housing 42, and extends through the first portion 44 to a second, opposite planar surface (not shown) of the first portion 44 so as to be open to the cavity 47. A plurality of small openings 52 is also formed about the periphery of the first surface 50 of the housing 42. The openings 52 may be equidistantly or variably spaced and may be substantially identical or variable in size. In one embodiment, a portion of the small openings 52, such as near the inlet port 48 for example, has a larger diameter than the remainder of the plurality of small openings 52.

Arranged in contact with the second planar surface (not shown) of the first housing 42 is an intermediate layer 54 formed from a sponge-like material, such as rubber or foam for example. As illustrated, the intermediate layer 54 has a shape similar to the first housing 42. However, the intermediate layer 54 is configured to expand when compressed, as shown in FIG. 3, so as to conform with the periphery of the interior surface 36 (FIG. 7) of the blade spar 30 and to close off the cavity 47. While shown with the intermediate layer 54 forming a bottom of the cavity 47, it is understood that in other aspects the cavity 47 could be completely contained within the first housing 42 such that the fluid does not pass from the second portion 46 to the intermediate layer 54. A second housing 56 having a shape substantially similar to the first housing 42 and the intermediate layer 54 is positioned adjacent the intermediate layer 54, opposite the first housing 42. The second housing 56 is generally formed from the same material as the first housing 42, and may be either solid or hollow.

At least one fastener 60 extends through a through hole 62 formed in the first housing 42, intermediate layer 54, and second housing 56 to affix the components 42, 54, 56 to one another. In the illustrated non-limiting embodiment, a first fastener 60 is arranged near a first side 41 of the assembly and a second, substantially identical fastener 60 is arranged adjacent a second, opposite side 43 of the assembly 40. A compression fastener 64 similarly extends through a through hole 66 arranged near the middle of the assembly 40. The compression fastener 64 may be substantially equal in length and/or diameter to the other fasteners 60, or alternatively, may have a larger diameter and or length as shown. While three fasteners are shown by way of example, other numbers of fasteners can be used in other aspects of the invention.

A first nut 70 is coupled to fasteners 60, 64 adjacent the first planar surface 50 of the first housing 42. Similarly, a second nut 72 is coupled to the fasteners 60, 64 adjacent the exposed planar surface 58 of the second housing 56. In the illustrated, non-limiting embodiment, a plurality of recesses 74 are formed in the exposed planar surface 58 adjacent each of the through holes 62, 66. The recesses 74 are configured to receive the second nut 72 connected to each fastener 60, 64 such that the nuts 72 are substantially flush with the planar surface 58 of the second housing 56. In another embodiment, the second nuts 72 may be integrally formed with the second housing 56, such as by forming threads in the portion of the through holes 62, 66 extending there through. The first nut 70 and second nut 72 coupled to the compression fastener 64 are used to increase and decrease the compression force applied by the first and second housings 42, 56 on the intermediate layer 54. When the compression force is increased, the intermediate layer 54 expands so that a cross-section of the intermediate layer 54 is larger than a cross-section of the adjacent housings 42, 56.

Figure 6:
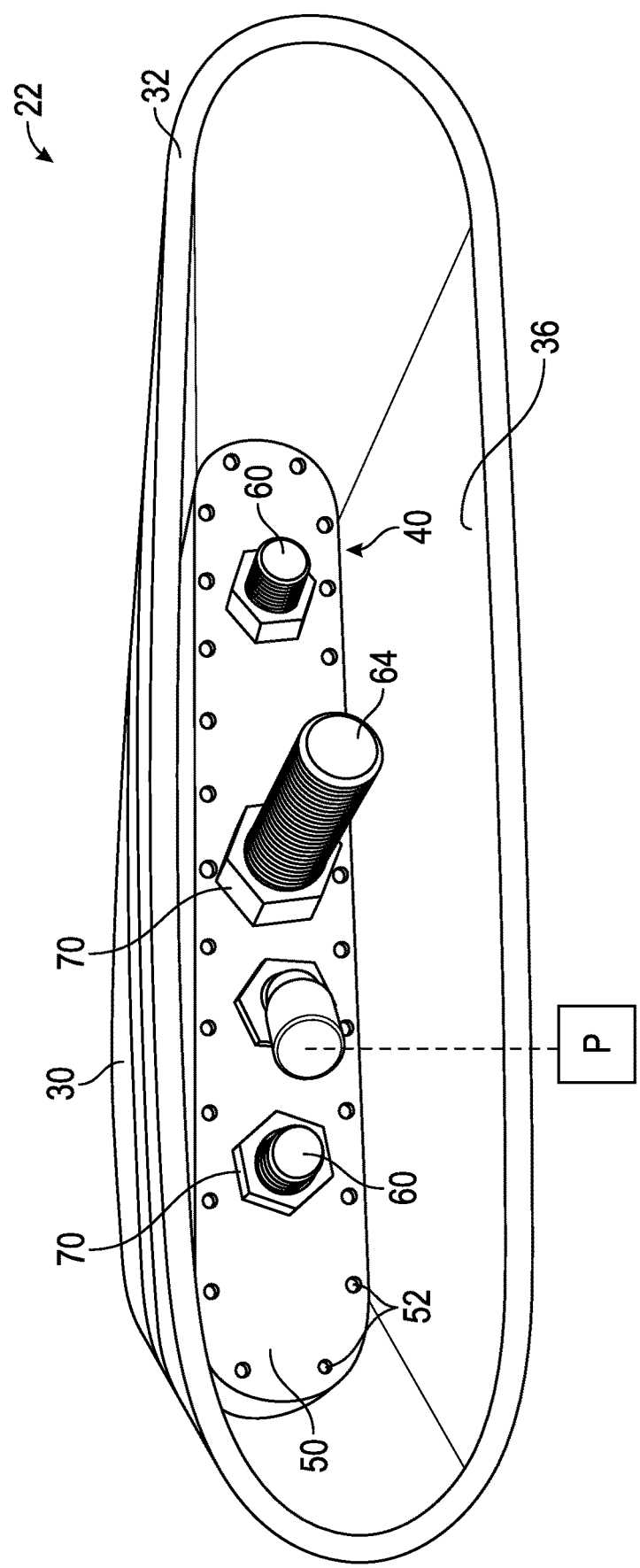
FIG. 6 is a perspective view of the assembly arranged within a rotor blade spar according to an embodiment of the invention.
Figure 7:
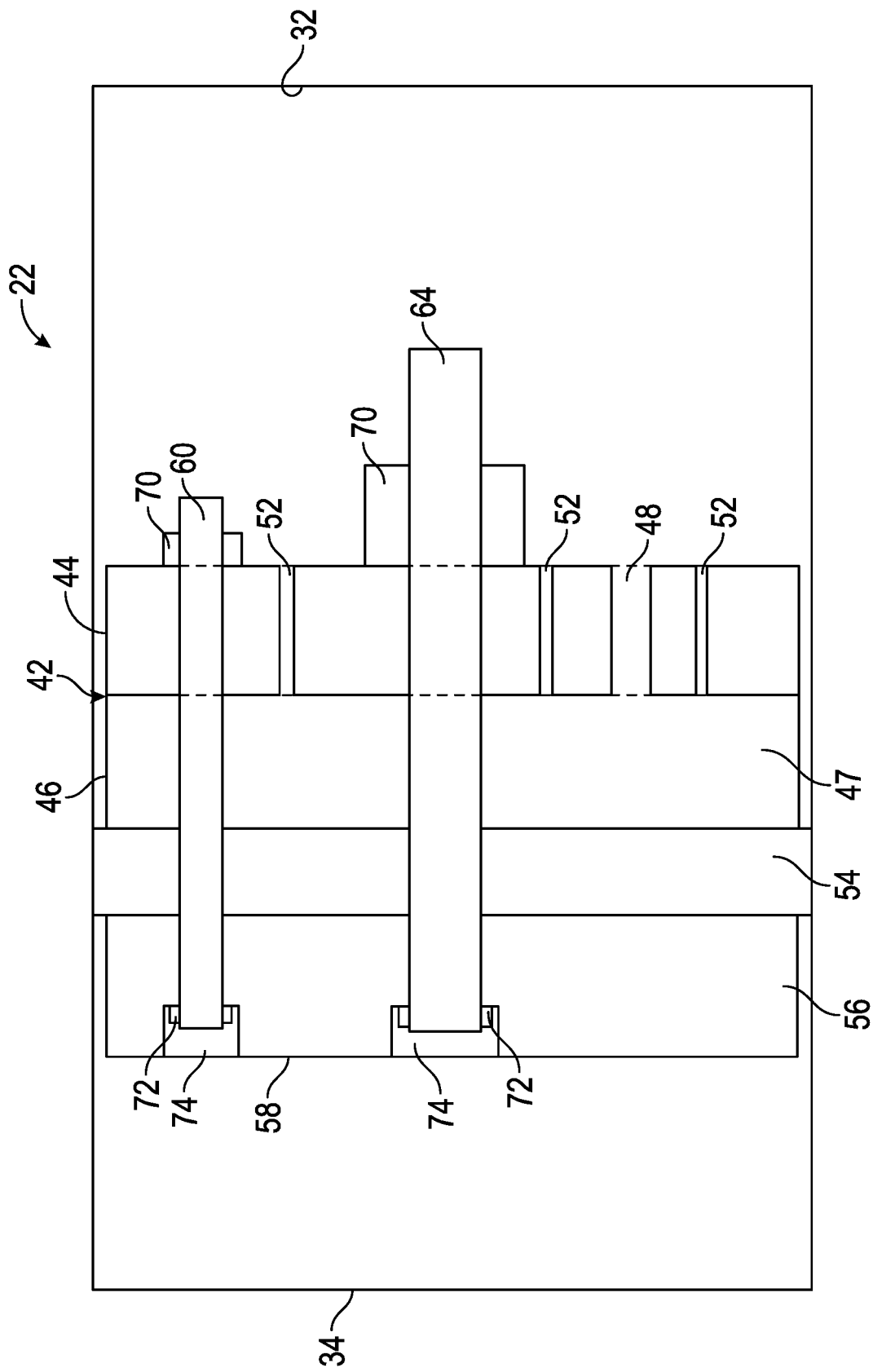
FIG. 7 is a cross-sectional view of the rotor blade assembly of FIG. 2 taken along lines L-L according to an embodiment of the invention.

Referring now to FIGS. 6 and 7, during manufacture of a rotor blade assembly 22, the assembly 40 is positioned within the spar 30 such that the first planar surface 50 of the first housing 42 faces the open, inboard end 32 of the spar and the exposed planar surface 58 of the second housing 56 faces the closed, outboard end 34 of the spar 30. In one embodiment, the assembly 40 is positioned at a distance between about two feet and about three feet from the inboard end 32 of the spar 30. When located at the desired position within the spar 30, the first nut 70 coupled to the compression fastener 64 is adjusted until the intermediate layer 54 forms a seal with the interior surface 36 of the spar 30. A pump (illustrated schematically at P in FIG. 6), operably coupled to a fluid supply, such as air or coolant for example, is connected to the inlet port 48. The fluid is configured to flow through the inlet port 48 into the cavity 47 of the first housing 42, and out through the plurality of small openings 52. While not required in all aspects, the fluid can pass partially through the intermediate layer 54 so as to clean or filter the fluid.

The reverse flow from the assembly 40 towards the open, inboard end 32 of the spar 30 counters the flow of debris and particles into the spar 30 without injecting fluid in the space between the closed, outboard end 34 of the spar 30 and the assembly 40. By positioning the assembly 40 between the closed end 34 and any interior surfaces 36 that are critical to flight safety, the fluid is injected via the inlet port 48 to pass through the first portion 44 of the housing 42 into the cavity 47. The fluid is stored within the cavity 47, and when sufficient pressure has built up, the fluid exits the assembly 40 from the cavity 47 via the openings 52 in the first housing 42 back towards the open, inboard end 32 of the spar 30. Since the assembly 40 is disposed between the closed end 34 and the surface to be protected 36, the fluid passes over the surface 36 such that surface characteristics of such critical surfaces 36 are protected from possible damage during the manufacturing process. In addition, use of the assembly 40 during manufacture of the rotor blade assemblies 22 greatly reduces work costs and improves the manufacturing process. Although the assembly 40 is illustrated and described herein within a blade spar 30, the assembly 40 may be positioned within any object having a hollow interior, an open end, and a closed end, to prevent damage during manufacture thereof, such as for cleaning gas and/or water pipelines, perform plumbing maintenance, or the like.

While the invention has been described in detail in connection with only a limited number of embodiments, it should be readily understood that the invention is not limited to such disclosed embodiments. By way of example, the first housing 42 may be a single piece as opposed to separate first and second portions 44, 46 as shown. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An assembly configured to prevent damage to an object during manufacture of the object, comprising:
   a first housing having a substantially hollow interior and an exposed first planar surface, an inlet port being formed in the first planar surface, and a plurality of openings being formed about a periphery of the first planar surface, such that the inlet port, the hollow interior, and the plurality of openings form a flow path for a fluid through the assembly;
   a second housing having an exposed second planar surface;
   an intermediate layer arranged between the first housing and the second housing, a cross-section of the intermediate layer being configured to change shape in response to a compression force applied thereto by the first housing and the second housing to form a seal separating an exterior portion of the object exposed to the plurality of openings from an interior surface of the object.

2. The assembly according to claim 1, wherein the flow path is configured to counter a flow of debris into the interior surface of the object.

3. The assembly according to claim 1, wherein the inlet port is connected to a pump operably coupled to a fluid supply.

4. The assembly according to claim 3, wherein the fluid supply includes one of air or coolant.

5. The assembly according to claim 1, wherein the plurality of openings are equidistantly spaced about the periphery of the first planar surface.

6. The assembly according to claim 1, wherein a portion of the plurality of openings have a diameter larger than a remainder of the plurality of openings.

7. The assembly according to claim 6, wherein the portion of openings are located adjacent to the inlet port and have a diameter larger than the remainder of the plurality of openings.

8. The assembly according to claim 1, further comprising at least one fastener extending through and being configured to affix the first housing, the intermediate layer, and the second housing to one another.

9. The assembly according to claim 1, further comprising a compression fastener extending through the first housing, the intermediate layer, and the second housing, a first nut coupled to the compression fastener being arranged adjacent the first planar surface, and a second nut connected to the compression fastener being arranged adjacent to the second planar surface.

10. The assembly according to claim 9, wherein the compression force applied to the intermediate layer by the first housing and the second housing is controlled by adjusting one of the first nut or the second nut.

* * * * *